(12) United States Patent
Ryu et al.

(10) Patent No.: US 11,846,901 B2
(45) Date of Patent: Dec. 19, 2023

(54) TEMPERATURE SENSOR PLACEMENT FOR HEATER SUBSTRATE IN FUSER

(71) Applicant: HEWLETT-PACKARD DEVELOPMENT COMPANY, L.P., Spring, TX (US)

(72) Inventors: Hojin Ryu, Seongnam-si (KR); Sunhyung Lee, Seongnam-si (KR); Sungwoo Kang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/908,594

(22) PCT Filed: Feb. 4, 2021

(86) PCT No.: PCT/US2021/016535
§ 371 (c)(1),
(2) Date: Sep. 1, 2022

(87) PCT Pub. No.: WO2021/183235
PCT Pub. Date: Sep. 16, 2021

(65) Prior Publication Data
US 2023/0097936 A1    Mar. 30, 2023

(30) Foreign Application Priority Data
Mar. 12, 2020 (KR) .......................... 10-2020-0030537

(51) Int. Cl.
*G03G 15/20* (2006.01)

(52) U.S. Cl.
CPC ..... *G03G 15/2039* (2013.01); *G03G 15/2053* (2013.01)

(58) Field of Classification Search
CPC .................. G03G 15/2039; G03G 15/2053
USPC ........................................................... 399/69
See application file for complete search history.

(56) References Cited

U.S. PATENT DOCUMENTS

| 10,416,598 B2 | 9/2019 | Shimura et al. |
| 10,514,636 B2 | 12/2019 | Takagi |
| 2015/0086231 A1 | 3/2015 | Bush et al. |

FOREIGN PATENT DOCUMENTS

| EP | 0947890 A2 | 10/1999 |
| JP | 11-329681 A | 11/1999 |
| JP | 2003-005570 A | 1/2003 |
| JP | 2014-145895 A | 8/2014 |
| JP | 2015-121629 A | 7/2015 |
| JP | 2017-173583 A | 9/2017 |

*Primary Examiner* — Quana Grainger
(74) *Attorney, Agent, or Firm* — Foley & Lardner LLP

(57) ABSTRACT

An example fuser includes a flexible fixing belt, a backup member to form a fixing nip with the fixing belt, a heater substrate for heating the fixing belt at the fixing nip and having a first surface comprising a heating element pattern, a common terminal and a driving power supply terminal for supplying power to the heating element pattern, and a second surface in contact with the fixing belt, and a temperature sensor sheet comprising a temperature sensor, a sensing terminal and an electric wire connecting the temperature sensor to the sensing terminal, wherein the temperature sensor sheet is in contact with the first surface of the heater substrate such that the sensing terminal and the electrical wire do not overlap the common terminal and the driving power supply terminal.

15 Claims, 16 Drawing Sheets

TEMPERATURE SENSOR PLACEMENT FOR HEATER SUBSTRATE IN FUSER

BACKGROUND

A printer using an electrophotographic method supplies toner to an electrostatic latent image formed on an image receptor to form a visible toner image on the image receptor, transfers the toner image to a print medium, and fixes the transferred toner image on the print medium.

The fixing process involves applying heat and pressure to the toner image on the print medium. A fuser may include a heating member and a pressing member to engage with each other to form a fixing nip. The heating member is heated by a heater. The print medium to which the toner image has been transferred is subjected to heat and pressure while passing through the fixing nip, and the toner image is fixed to the print medium.

DETAILED DESCRIPTION OF EXAMPLES

An electrophotographic printer may include a printing unit for forming a visible toner image on a print medium P, for example, a paper, and a fuser for fixing the toner image to the print medium P. The printing unit may include an exposure unit, a photosensitive drum, a developing unit, a transfer unit, etc. The exposure unit is to irradiate light modulated according to image information on a surface of a photosensitive drum charged with a uniform surface electric potential to form an electrostatic latent image on the surface of the photosensitive drum. The developing unit is to supply toner to the electrostatic latent image formed on the photosensitive drum to develop the electrostatic latent image into a toner image. The transfer unit is to transfer the toner image formed on the photosensitive drum to the print medium P. The toner image transferred to the print medium P is maintained on the print medium P by an electrostatic force. The fuser is to fix the toner image transferred to the print medium P by applying heat and pressure to the print medium P.

To increase printing speed and reduce energy consumption, a heated portion having a small heat capacity may be employed in the fuser. For example, a fixing belt in the form of a thin film may be employed as the heated portion. By employing the fixing belt in the form of a thin film, a temperature of the fixing belt may be quickly raised to a fixing temperature, and printing is soon possible after a printer is turned on.

Figure 1:
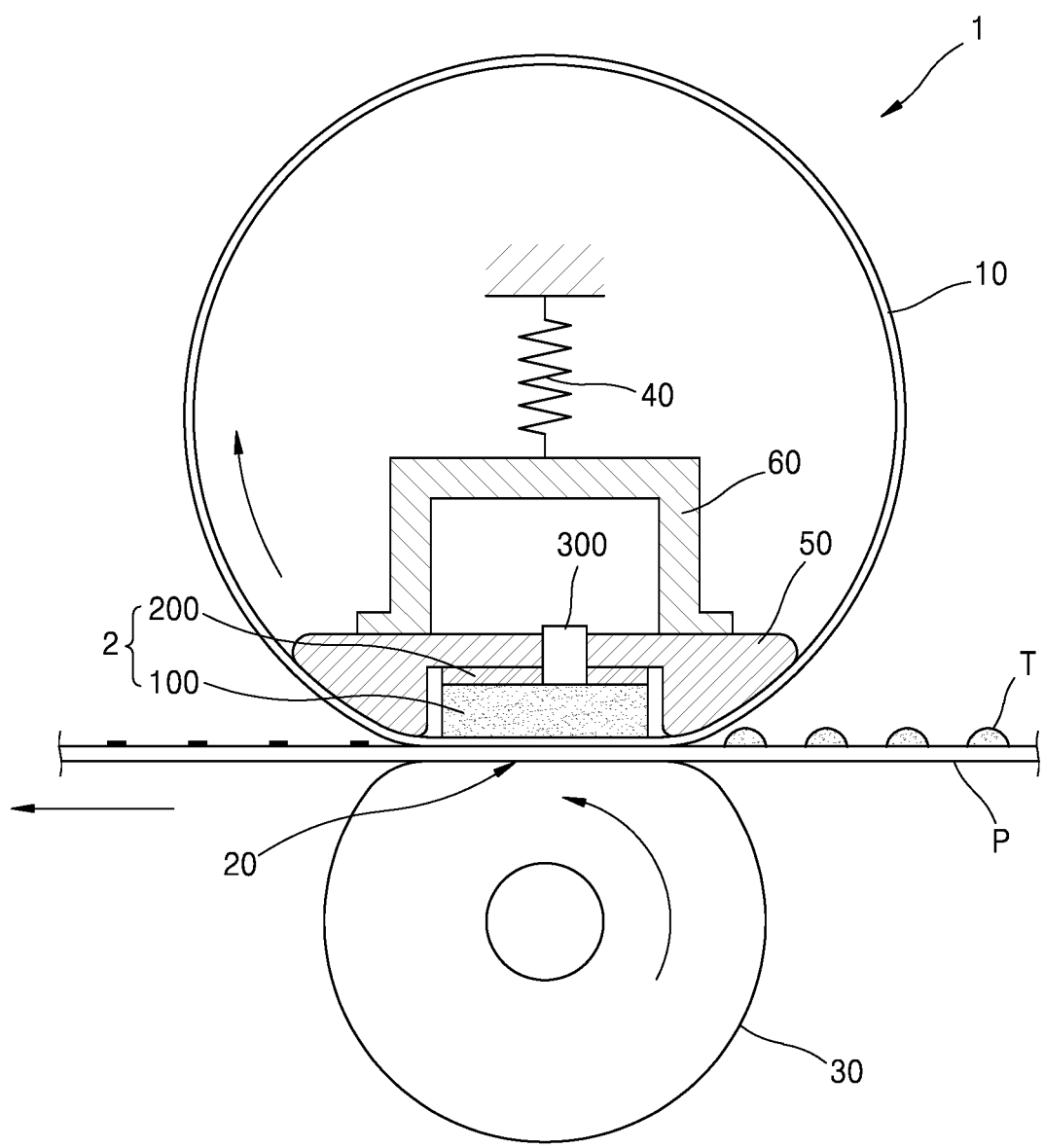
FIG. 1 illustrates a fuser according to an example.
Figure 2:
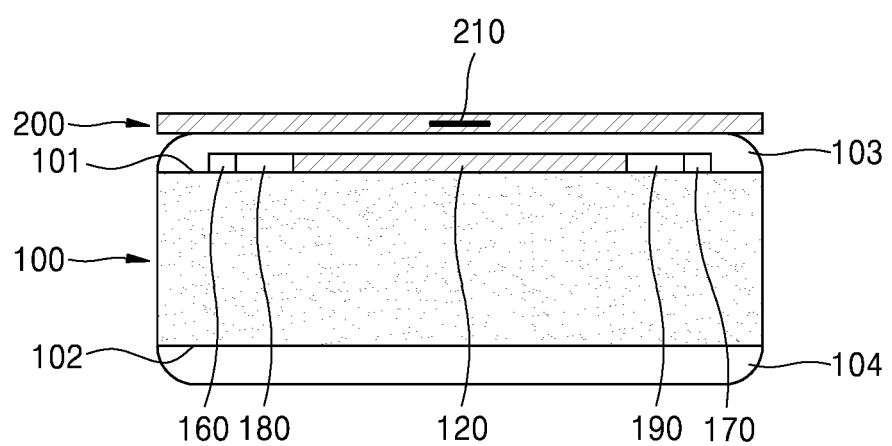
FIG. 2 is a side view of a plate heater shown in FIG. 1 according to an example.
Figure 3:
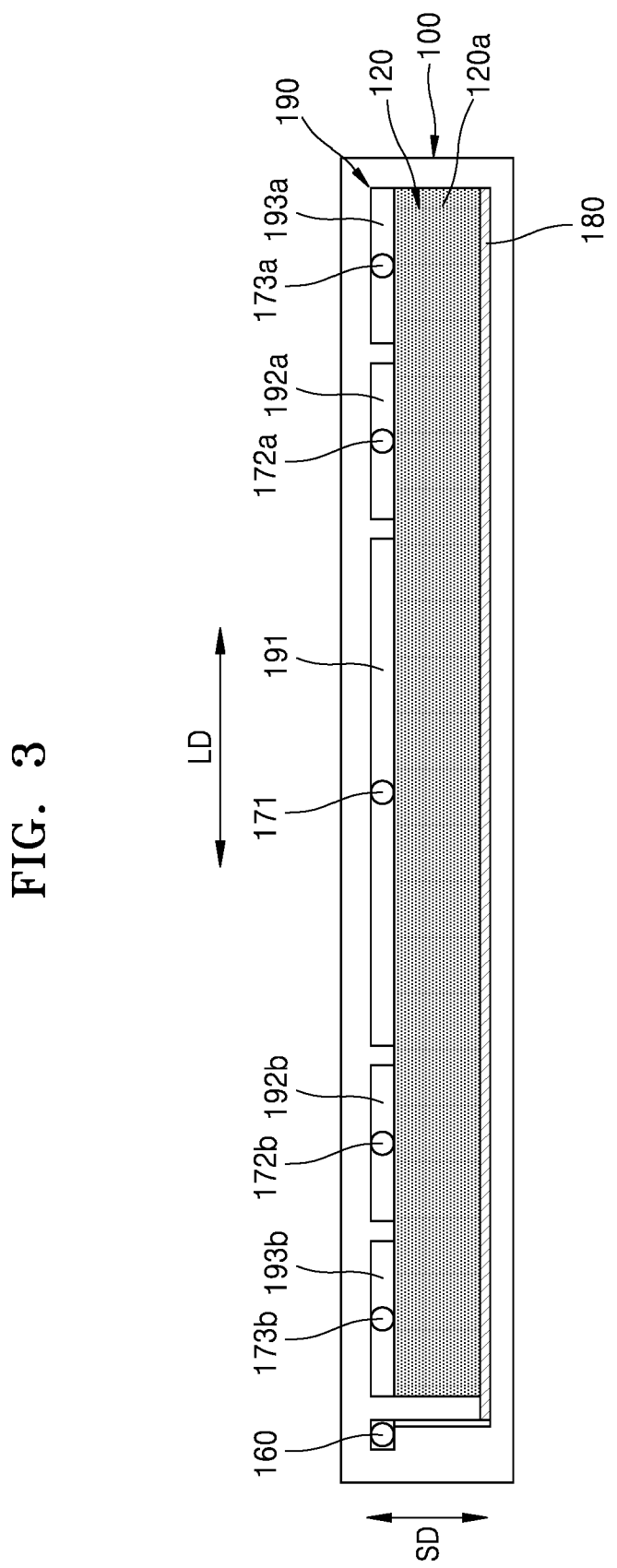
FIG. 3 is a plan view of a heater substrate according to an example.
Figure 4:
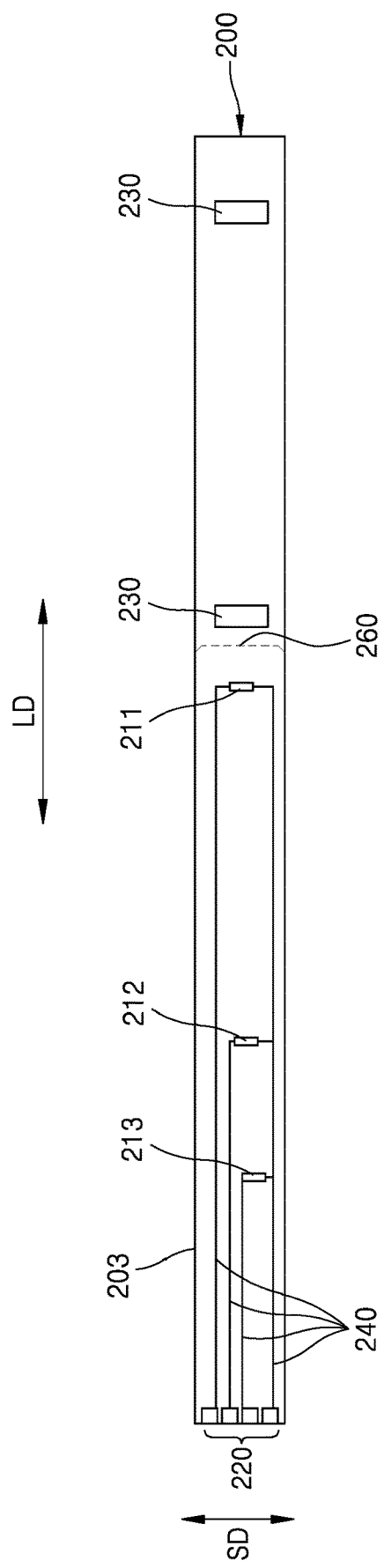
FIG. 4 is a plan view of a temperature sensor sheet according to an example.
Figure 5:
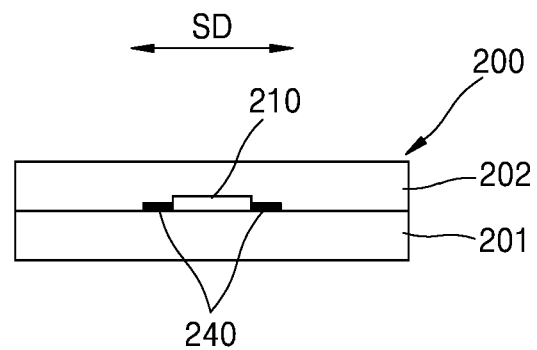
FIG. 5 is a cross-sectional view of a temperature sensor sheet according to an example.
Figure 6:
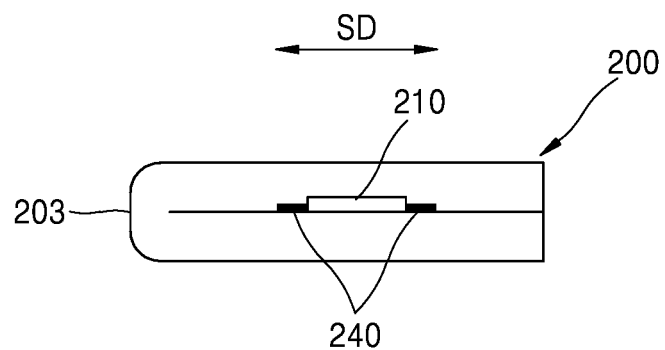
FIG. 6 is a cross-sectional view of a temperature sensor sheet according to an example.
Figure 7:
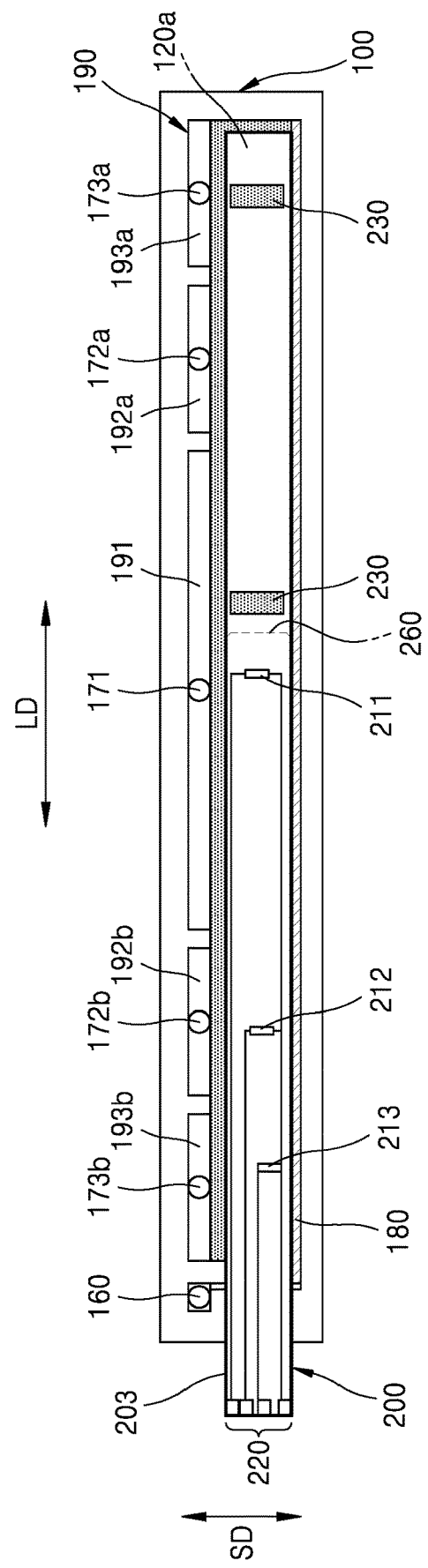
FIG. 7 is a plan view showing a state in which the temperature sensor sheet illustrated in FIG. 4 is mounted on the heater substrate illustrated in FIG. 3 according to an example.
Figure 8:
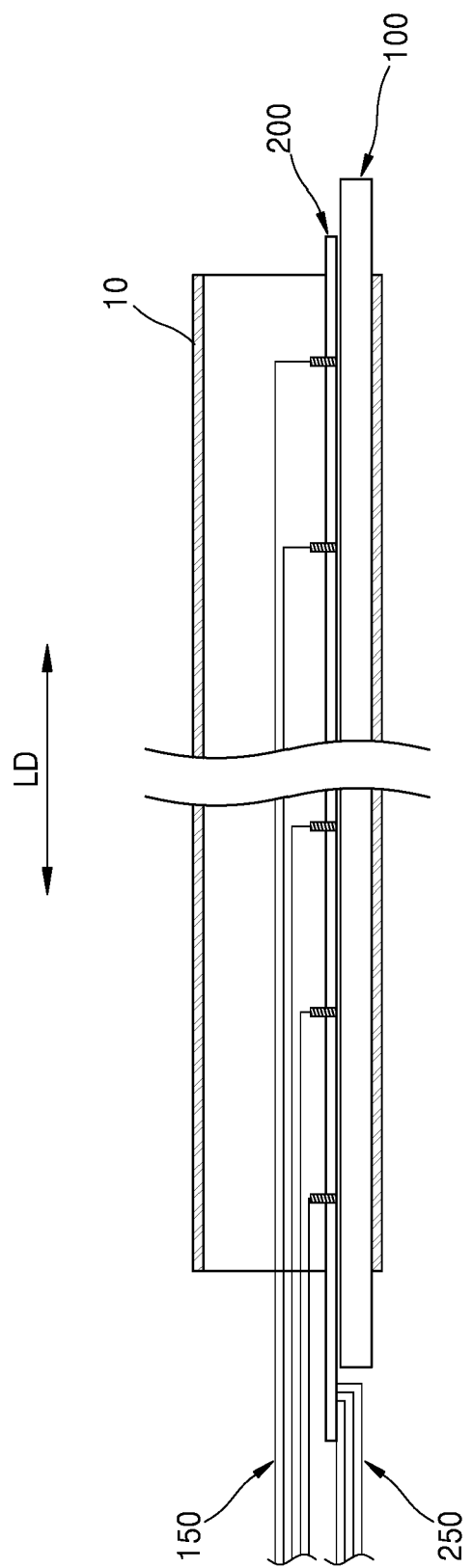
FIG. 8 is a front cross-sectional view showing a state in which the temperature sensor sheet illustrated in FIG. 4 is mounted on the heater substrate illustrated in FIG. 3 according to an example.

FIG. 1 illustrates a fuser according to an example. FIG. 2 is a side view of a plate heater shown in FIG. 1 according to an example. FIG. 3 is a plan view of a heater substrate according to an example. FIG. 4 is a plan view of a temperature sensor sheet according to an example. FIG. 5 is a cross-sectional view of a temperature sensor sheet according to an example. FIG. 6 is a cross-sectional view of a temperature sensor sheet according to an example. FIG. 7 is a plan view showing a state in which the temperature sensor sheet illustrated in FIG. 4 is mounted on the heater substrate illustrated in FIG. 3 according to an example. FIG. 8 is a front cross-sectional view showing a state in which the temperature sensor sheet illustrated in FIG. 4 is mounted on the heater substrate illustrated in FIG. 3 according to an example.

Referring to FIGS. 1 to 8, a fuser 1 includes a flexible fixing belt 10, a backup member 30 located outside the fixing belt 10 to form a fixing nip 20, a heater substrate 100, and a temperature sensor sheet 200. The heater substrate 100 and the temperature sensor sheet 200 may form a plate heater 2.

The heater substrate 100 may include a first surface 101 including a heating element pattern 120 as well as a common terminal 160 and a driving power supply terminal 170 for supplying power to the heating element pattern 120. The heater substrate 100 may include a second surface 102 to be in contact with the fixing belt 10 and to heat the fixing belt 10 at the fixing nip 20. The temperature sensor sheet 200 may include a temperature sensor 210, a sensing terminal 220, and an electric wire 240 to connect the temperature sensor 210 to the sensing terminal 220. The temperature sensor sheet 200 may be in contact with the first surface 101 of the heater substrate 100 such that the sensing terminal 220 and the electric wire 240 do not overlap the common terminal 160 and the driving power supply terminal 170. The temperature sensor sheet 200 may be in contact with the first surface 101 of the heater substrate 100 such that the temperature sensor 210, the sensing terminal 220, and the electric wire 240 do not overlap the common terminal 160 and the driving power supply terminal 170.

As illustrated in FIG. 1, the heater substrate 100 may be located inside the fixing belt 10 to heat the fixing belt 10.

The backup member 30 may be located outside the fixing belt 10 to face the heater substrate 100. A pressing member 40 may provide a pressing force to the heater substrate 100 or the backup member 30. The heater substrate 100 and the backup member 30 may be pressed toward each other by a pressing force of the pressing member 40 to form the fixing nip 20. The heater substrate 100 is to heat the fixing belt 10 at the fixing nip 20. When the print medium P with a toner image T formed on the surface thereof passes through the fixing nip 20, the toner image T may be fixed to the print medium P by heat and pressure.

The fixing belt 10 may include a flexible base layer (not shown). The base layer may include a thin metal film such as stainless steel, nickel, nickel copper, or the like. The base layer may include a polymer film having heat resistance and abrasion resistance that may withstand a fixing temperature, such as a polyimide film, a polyamide film, a polyimideamide film, or the like. A release layer (not shown) may be provided on one side or on both sides of the backup member 30 of the base layer. The release layer may include a resin layer having a separation capability. The release layer may include, for example, perfluoroalkyl (PFA), polytetrafluoroethylene (PTFE), fluorinated ethylene propylene (FEP), or the like. To provide a relatively wide and flat fixing nip 20, an elastic layer (not shown) may be located between the base layer and the release layer. The elastic layer may include a material having heat resistance capable of withstanding a fixing temperature. For example, the elastic layer may include a rubber material such as fluorine rubber, silicone rubber, or the like.

The backup member 30 may be a backup roller for moving the fixing belt 10 by being pressed against the heater substrate 100 with the fixing belt 10 therebetween and rotated. The backup member 30 may include an elastic layer (not shown). As an example, the elastic layer may be formed of rubber, a thermoplastic elastomer, or the like. A release layer (not shown) may be further provided on an outer surface of the elastic layer. The release layer may include PFA, PTFE, FEP, or the like.

The pressing member 40 may, for example, provide a pressing force toward the backup member 30 to the heater substrate 100. As an example, the pressing member 40 may provide a pressing force to a heater holder 50 supporting the heater substrate 100, or a pressing bracket 60 connected to the heater holder 50. A structure for providing a pressing force to the heater substrate 100 is not limited to the structure shown in FIG. 1.

Referring to FIGS. 2 and 3, the heater substrate 100 may include a heat conduction substrate. The heater substrate 100 may include, for example, a ceramic substrate. As a ceramic material, for example, alumina ($Al_2O_3$), aluminum nitride (AlN), or the like may be used. The heater substrate 100 includes the first surface 101 and the second surface 102. The heating element pattern 120, the common terminal 160, and the driving power supply terminal 170 are located on the first surface 101 of the heater substrate 100. The heating element pattern 120 is to receive electric energy and to generate heat. The heating element pattern 120 may be formed of, for example, a metal heating material such as a silver-palladium (Ag—Pd) alloy. The common terminal 160 and the driving power supply terminal 170 may be connected to a common electrode 180 and a driving electrode 190, which will be described below. The common electrode 180 and the driving electrode 190 may be, for example, silver-tungsten (Ag—Pt) electrodes, silver (Ag) electrodes, or the like. An electrical insulating layer 103 may be provided on the first surface 101 of the heater substrate 100.

The electrical insulating layer 103 may cover the heating element pattern 120, the common electrode 180, and the driving electrode 190. The electrical insulating layer 103 may function as a protective layer that protects the heating element pattern 120, the common electrode 180, and the driving electrode 190. The electrical insulating layer 103 may be, for example, a glass layer. The common terminal 160 and the driving power supply terminal 170 may be formed by exposing some or all of the common electrode 180 and the driving electrode 190 from an electrical insulating layer 103. The second surface 102 is to face an inner surface of the fixing belt 10. The second surface 102 is to make contact with the fixing belt 10. To reduce wear of the heater substrate 100 or wear of the fixing belt 10, an anti-wear layer 104 may be provided on the second surface 102. The anti-wear layer 104 may include a material having a small coefficient of friction. The anti-wear layer 104 may be, for example, a glass layer.

A temperature of the heater substrate 100 may be controlled to a fixing temperature. To this end, the fuser 1 includes the temperature sensor 210 that detects a temperature of the heater substrate 100. The temperature sensor 210 may detect a temperature of the heating element pattern 120. In order to detect a temperature of the heater substrate 100 at a plurality of locations, the fuser 1 may include a plurality of temperature sensors 210.

A method in which a plurality of temperature sensors 210 are individually installed to contact the first surface 101 of the heater substrate 100 may be considered. In this case, a sensing signal line needs to extend from the plurality of temperature sensors 210. The sensing signal line may extend in a width direction of the fixing belt 10. Power may be supplied to the heating element pattern 120 through the common terminal 160 and the driving power supply terminal 170 and a power supply line connected to the common terminal 160 and the driving power supply terminal 170 may extend in the width direction of the fixing belt 10. If a large number of sensing signal lines and electric power supply lines pass through the inside of the fixing belt 10 and are drawn out to the outside, it is difficult to reduce a diameter of the fixing belt 10, which is disadvantageous for miniaturization of the fuser 1.

To address this disadvantage, a method of integrating the temperature sensor 210 into the first surface 101 of the heater substrate 100 may be considered. However, this method may increase a production cost of the heater substrate 100. For example, in a process of forming the temperature sensor 210, a sensing signal line, and a sensing terminal on the heater substrate 100 on which the heating element pattern 120, the common electrode 180, and the driving electrode 190 are formed, heat stress is accumulated in the heater substrate 100 and there is a possibility that the heater substrate 100 is damaged. In addition, in a process of forming the temperature sensor 210, the electric wire 240, and the sensing terminal 220 on the heater substrate 100, there is a possibility that the heating element pattern 120, the common electrode 180, and the driving electrode 190 are deformed or damaged.

A method of mounting the temperature sensor 210 on the second surface 102 of the heater substrate 100 may also be considered. However, the second surface 102 is a surface that is in friction contact with the moving fixing belt 10 and is not suitable for mounting the temperature sensor 210.

Referring to FIGS. 4 to 6, the temperature sensor 210 may be provided on the temperature sensor sheet 200, and the temperature sensor sheet 200 may be arranged to contact the first surface 101 of the heater substrate 100.

The temperature sensor sheet 200 may be mounted on the first surface 101 of the heater substrate 100 to be in contact. Here, to be in contact with the first surface 101 of the heater substrate 100 means that the temperature sensor sheet 200 contacts the outermost surface of the heater substrate 100 on which the heating element pattern 120 is formed. In an example, the temperature sensor sheet 200 is in contact with the electrical insulating layer 103 covering the heating element pattern 120. When there is another material layer outside the electrical insulating layer 103, the temperature sensor sheet 200 may be in contact with the other material layer.

According to such a configuration, when a sensing terminal is provided at either end of the temperature sensor sheet 200 in a long side direction LD, a sensing signal line drawn out from the sensing terminal does not have to pass through the inside of the fixing belt 10. Therefore, a path of the sensing signal line may be simplified, and the diameter of the fixing belt 10 may be reduced, which is advantageous for miniaturization of the fuser 1.

The heater substrate 100 may be provided with the common terminal 160 and the driving power supply terminal 170 for supplying power to the heating element pattern 120. The sensing terminal 220 connected to the temperature sensor 210 may be provided on the temperature sensor sheet 200. The sensing terminal 220 does not overlap the common terminal 160 and the driving power supply terminal 170. AC power for driving the heating element pattern 120 may be supplied to the common terminal 160 and the driving power supply terminal 170. DC power may be supplied to the temperature sensor 210. Electrical safety may be improved by separating the sensing terminal 220 from the common terminal 160 and the driving power supply terminal 170.

Hereinafter, various examples of the heater substrate 100 and the temperature sensor sheet 200 will be described.

Referring to FIG. 3, the heating element pattern 120 may include the solid pattern 120a extending in a long side direction LD of the heater substrate 100. The driving electrode 190 may be arranged to contact the solid pattern 120a on one side of the heater substrate 100 in a short side direction SD, and may include a plurality of driving electrodes 191, 192a, 192b, 193a, and 193b arranged in the long side direction LD. The common electrode 180 may be arranged to contact the solid pattern 120a on the other side of the heater substrate 100 in the short side direction SD. The driving power supply terminal 170 may be connected to the plurality of driving electrodes 191, 192a, 192b, 193a, and 193b, and may include a plurality of driving power supply terminals 171, 172a, 172b, 173a, and 173b provided on one side of the heater substrate 100 in the short side direction SD. The common terminal 160 may be connected to the common electrode 180, and may be arranged on one side of the heater substrate 100 in the long side direction LD in parallel with the plurality of driving power supply terminals 171, 172a, 172b, 173a, and 173b. Here, the long side direction LD is a width direction of the fixing belt 10, and the short side direction SD is a moving direction of the fixing belt 10. A length of the heater substrate 100 in the long side direction LD may be greater than a width of the fixing belt 10.

The plurality of driving electrodes 191, 192a, 192b, 193a, and 193b have lengths in the long side direction LD and are apart from each other. Each of the plurality of driving electrodes 191, 192a, 192b, 193a, and 193b may have the same length in the long side direction LD. At least one of the plurality of driving electrodes 191, 192a, 192b, 193a, and 193b may have a different length in the long side direction LD than another of the plurality of driving electrodes 191, 192a, 192b, 193a, and 193b. In an example, the plurality of driving electrodes 191, 192a, 192b, 193a, and 193b are symmetrical in the long side direction LD. The driving electrode 191 located at the center may be longer than the driving electrodes 192a, 192b, 193a, and 193b located at both sides. The driving electrodes 192a and 192b may be symmetrical about the driving electrode 191 and have the same length. The driving electrodes 193a and 193b may be symmetrical about the driving electrode 191 and have the same length.

The plurality of driving electrodes 191, 192a, 192b, 193a, and 193b may be provided with the driving power supply terminals 171, 172a, 172b, 173a, and 173b, respectively. Power may be selectively supplied to the plurality of driving electrodes 191, 192a, 192b, 193a, and 193b according to a width of the print medium P. For example, when the print medium P is A5 paper, power may be supplied to the driving electrode 191 through the driving power supply terminal 171. In that case, heat is generated in an area in contact with the driving electrode 191 of the solid pattern 120a, and heat is not generated in an area other than the area in contact with the driving electrode 191. By such a configuration, it is possible to reduce or prevent overheating of an area in which the print medium P does not pass in the heater substrate 100. When the print medium P is A4 paper, power may be supplied to the driving electrodes 191, 192a, and 192b through the driving power supply terminals 171, 172a, and 172b. When the print medium P is B4 paper, power may be supplied to the driving electrodes 191, 192a, 192b, 193a, and 193b through the driving power supply terminals 171, 172a, 172b, 173a, and 173b.

The common electrode 180 may be in contact with the solid pattern 120a, extend to one end of the heater substrate 100 in the long side direction LD, and extend to a position parallel to the plurality of driving electrodes 191, 192a, 192b, 193a, and 193b in the short side direction SD. The common terminal 160 may be provided at an extended end of the common electrode 180.

With such a configuration, the driving power supply terminals 171, 172a, 172b, 173a, and 173b and the common terminal 160 are arranged on one side of the heater substrate 100 in the short side direction SD. Therefore, power supply lines 150 (of FIG. 8) may be connected to the driving power supply terminals 171, 172a, 172b, 173a, and 173b and the common terminal 160.

Referring to FIG. 4, the temperature sensor 210 may include a plurality of temperature sensors 211, 212, and 213. The plurality of temperature sensors 211, 212, and 213 and the sensing terminal 220 are connected to each other by a plurality of electric wires 240. The plurality of electric wires 240 may include one common wire and an individual wire corresponding to each of the plurality of temperature sensors 211, 212, and 213. The plurality of temperature sensors 211, 212, and 213 may be apart from each other in the long side direction LD. The sensing terminal 220 may be arranged on one side of the temperature sensor sheet 200 in the long side direction LD.

The temperature sensor sheet 200 may be, for example, a flexible sheet having heat resistance. The temperature sensor 210 may be, for example, a positive temperature coefficient (PTC) thermistor, or a negative temperature coefficient (NTC) thermistor.

As an example, referring to FIGS. 4 and 5, the temperature sensor sheet 200 may include a base layer 201 on which the temperature sensor 210, the sensing terminal 220, and the electric wire 240 are located, and a cover layer 202 covering the temperature sensor 210 and the electric wire 240. The sensing terminal 220 is exposed to the outside. For example, the cover layer 202 may be located on the base layer 201 to expose the sensing terminal 220. The base layer 201 and the cover layer 202 may be, for example, a polymer film layer having heat resistance and electrical insulation such as polyimide (PI), polyamideimide (PAI), polyetheretherketone (PEEK), polyethylene terephthalate (PET), epoxy resin, or the like. The cover layer 202 may be formed by coating the above-described polymer material on the base layer 201 to cover the temperature sensor 210 and the electric wire 240. The thickness of the base layer 201 and the cover layer 202 may be, for example, about 10 μm to about 200 μm.

As an example, referring to FIGS. 4 and 6, the temperature sensor sheet 200 may be implemented by a polymer film folded in a "c" shape in the long side direction LD or the short side direction SD so as to surround the temperature sensor 210 and the electric wire 240. In this case, a folded portion (bent portion) 203 of the temperature sensor sheet 200 is directed toward the common terminal 160 and the driving power supply terminal 170, which will be described below, to improve withstand voltage performance. That is, an affect of AC power supplied through the common terminal 160 and the driving power supply terminal 170 on the temperature sensor 210 and a sensing signal line using DC power may be reduced or prevented.

Referring to FIG. 7, the temperature sensor sheet 200 is located on the first surface 101 of the heater substrate 100. The temperature sensor sheet 200 may be adhered to the first surface 101 of the heater substrate 100 by, for example, a heat conduction adhesive. The temperature sensor sheet 200 may be fixed to the first surface 101 of the heater substrate 100 by a fixing member (not shown). The temperature sensor sheet 200 may be placed on the first surface 101 of the heater substrate 100 and may be pressed toward the first surface 101 by, for example, the heater holder 50 or other members.

The plurality of temperature sensors 211, 212, and 213 measure temperatures of areas corresponding to the driving electrodes 191, 192b, and 193b of the solid pattern 120a, respectively. The temperature sensor sheet 200 is in contact with the first surface 101 of the heater substrate 100 such that the plurality of temperature sensors 211, 212, and 213, the sensing terminal 220, and the electric wire 240 do not overlap the common terminal 160 and the driving power supply terminals 171, 172a, 172b, 173a, and 173b. The sensing terminal 220 may be provided at either end of the temperature sensor sheet 200 in the long side direction LD. The temperature sensor sheet 200 may be mounted on the heater substrate 100 such that the sensing terminal 220 is outwardly apart from one end of the heater substrate 100 in the long side direction LD. With such a configuration, the sensing terminal 220 to which a sensing signal line 250 (of FIG. 8), which is a DC signal line, is connected is separated from the driving power supply terminals 171, 172a, 172b, 173a, and 173b to which the power supply lines 150 for supplying AC power are connected and the common terminal 160, thereby improving electrical safety. When the temperature sensor sheet 200 is folded in a "c" shape in the short-side direction SD to surround the temperature sensor 210 and the electric wire 240, the temperature sensor sheet 200 is arranged such that the bent portion 203 faces the common terminal 160 and the driving power supply terminal 170. Thereby, withstand voltage performance may be improved.

Although not shown in the drawings, the temperature sensor sheet 200 may further be provided with a temperature sensor for measuring temperatures of areas corresponding to the driving electrodes 192a and 193a of the solid pattern 120a.

Referring to FIG. 8, the power supply lines 150 connected to the driving power supply terminals 171, 172a, 172b, 173a, and 173b and the common terminal 160 are drawn in the long side direction LD along the inside of the fixing belt 10 and connected to an electric power supply unit (not shown). Because the sensing signal line 250 extends in the long side direction LD from the sensing terminal 220 provided at one end of the temperature sensor sheet 200 in the long side direction LD, a path of the sensing signal line 250 may be simplified. In addition, because the sensing signal line 250 does not pass through the inside of the fixing belt 10, the diameter of the fixing belt 10 may be reduced, which is effective for downsizing the fuser 1.

Referring to FIGS. 4 and 7, a through hole 230 may be provided in the temperature sensor sheet 200. In the example of FIGS. 4 and 7, two through holes 230 are illustrated. The first surface 101 of the heater substrate 100 may be exposed through the through hole 230. Referring to FIG. 1, the fuser 1 may include a thermostat 300 for reducing or preventing overheating. The thermostat 300 cuts off power supplied to the driving power supply terminal 170 when temperature of the heater substrate 100 exceeds a certain temperature. The thermostat 300 may contact the first surface 101 of the heater substrate 100. By providing the through hole 230 in the temperature sensor sheet 200, the first surface 101 of the heater substrate 100 may be exposed through the through hole 230. Therefore, the thermostat 300 may contact the first surface 101 of the heater substrate 100 through the through hole 230.

An appropriate number of through holes 230 may be formed at appropriate positions such that the temperature sensor 210 and the thermostat 300 complement each other to reduce or prevent overheating of the heater substrate 100 or the heating element pattern 120. For example, referring to FIG. 7, positions of two through holes 230 may be positions where areas corresponding to the driving electrodes 191 and 193a of the solid pattern 120a are exposed. Because the area corresponding to the driving electrode 191 of the solid pattern 120a is an area that is always heated during fixing, the temperature sensor 211 and the thermostat 300 may be used to detect and reduce or prevent the presence of overheating in this area. Accordingly, even in the case of a malfunction of a temperature detection circuit, overheating of the area corresponding to the driving electrode 191 of the solid pattern 120a may be reduced or prevented. Areas corresponding to the driving electrodes 193a and 193b of the solid pattern 120a are areas corresponding to an edge of the print medium P in a width direction, and a portion of the two areas may be non-passing areas through which the print medium P does not pass. Because there is no heat transfer to the print medium P in the non-passing area, there is a possibility of overheating. Therefore, the thermostat 300 and the temperature sensor 211 may be used to detect overheating of areas corresponding to the driving electrodes 193a and 193b of the solid pattern 120a. Although not shown in the drawings, positions of the two through holes 230 may be positions where the areas corresponding to the driving electrodes 192a and 193a of the solid pattern 120a are exposed. In this case, whether areas corresponding to the driving electrodes 191, 192b, and 193b of the solid pattern 120a are overheated may be detected by the temperature sensors 211, 212, and 213, and overheating of the areas corresponding to the driving electrodes 192a and 193a of the solid pattern 120a may be reduced or prevented by two thermostats 300. Although not shown in the drawings, the temperature sensor sheet 200 may be provided at a position where three through holes 230 expose areas corresponding to the driving electrodes 191, 192a, and 193a of the solid pattern 120a. In this case, overheating of the area corresponding to the driving electrode 191 of the solid pattern 120a may be reduced or prevented by the temperature sensor 211 and the thermostat 300, overheating of the areas corresponding to the driving electrodes 192b and 193b of the solid pattern 120a may be reduced or prevented by the temperature sensors 212 and 213, and overheating of the areas corresponding to the driving electrodes 192a and 193a of the solid pattern 120a may be reduced or prevented by the two thermostats 300.

Referring again to FIGS. 4 and 7, as indicated by dashed line 260, the length of the temperature sensor sheet 200 in the long side direction LD may be less than the length of the heater substrate 100 in the long side direction LD. As shown in FIG. 7, when the temperature sensor sheet 200, in which the length of the temperature sensor sheet 200 in the long side direction LD is less than the length of the heater substrate 100 in the long side direction LD, is mounted on the first surface 101 of the heater substrate 100, the first surface 101 of the heater substrate 100 is partially exposed. Therefore, there is no need to provide the through hole 230 for mounting the thermostat 300 on the temperature sensor sheet 200.

Figure 9:
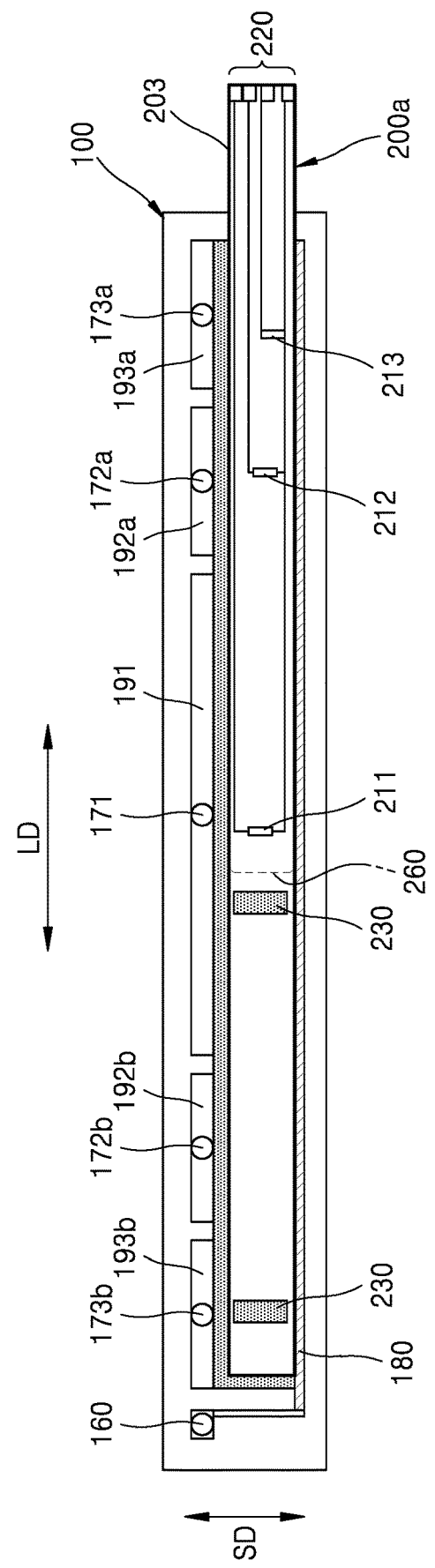
FIG. 9 is a plan view showing a state in which a temperature sensor sheet is mounted on a heater substrate according to an example.
Figure 10:
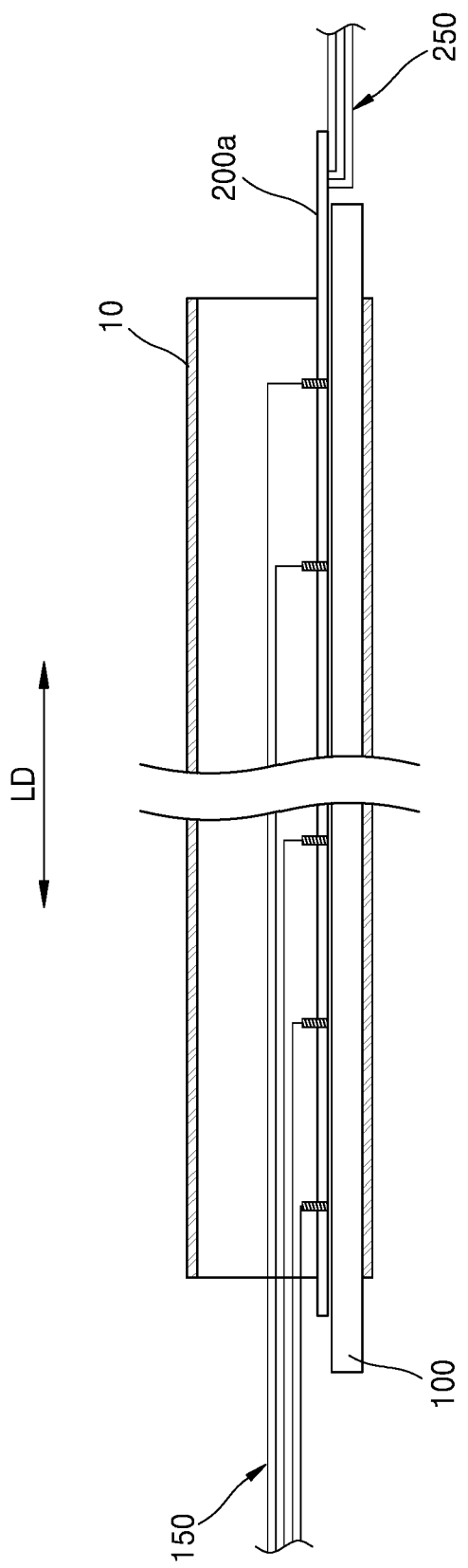
FIG. 10 is a front cross-sectional view of a state in which the temperature sensor sheet shown in FIG. 9 is mounted on a heater substrate according to an example.

FIG. 9 is a plan view showing a state in which a temperature sensor sheet is mounted on a heater substrate according to an example. FIG. 10 is a front cross-sectional view of a state in which the temperature sensor sheet shown in FIG. 9 is mounted on a heater substrate according to an example.

Referring to FIGS. 9 and 10, the heater substrate 100 is the same as the heater substrate 100 shown in FIG. 3. A temperature sensor sheet 200a is different from the temperature sensor sheet 200 shown in FIG. 4 in that the temperature sensors 211, 212, and 213 measure the temperatures of the areas corresponding to the driving electrodes 191, 192a, and 193a of the solid pattern 120a, respectively, and in that the sensing terminal 220 is located on the opposite side of the temperature sensor sheet 200a opposite to the common terminal 160 in the long side direction LD.

For example, referring to FIG. 7, the positions of the two through holes 230 may be positions where the areas corresponding to the driving electrodes 191 and 193b of the solid pattern 120a are exposed. Although not shown in the drawings, the positions of the two through holes 230 may be positions where the areas corresponding to the driving electrodes 192b and 193b of the solid pattern 120a are exposed. Although not shown in the drawings, the temperature sensor sheet 200a may be provided with three through holes 230 at a position where the three through holes 230 expose the areas corresponding to the driving electrodes 191, 192b, and 193b of the solid pattern 120a.

The power supply lines 150 connected to the driving power supply terminals 171, 172a, 172b, 173a, and 173b and the common terminal 160 are drawn in the long side direction LD along the inside of the fixing belt 10 and connected to an electric power supply unit (not shown). The sensing signal line 250 extends outward of the fixing belt 10 from the sensing terminal 220 located on the side opposite to the common terminal 160 in the long side direction LD. Therefore, the sensing signal line 250, which is a DC signal line, may be stably separated from the power supply lines 150, which are AC power lines.

Figure 11:
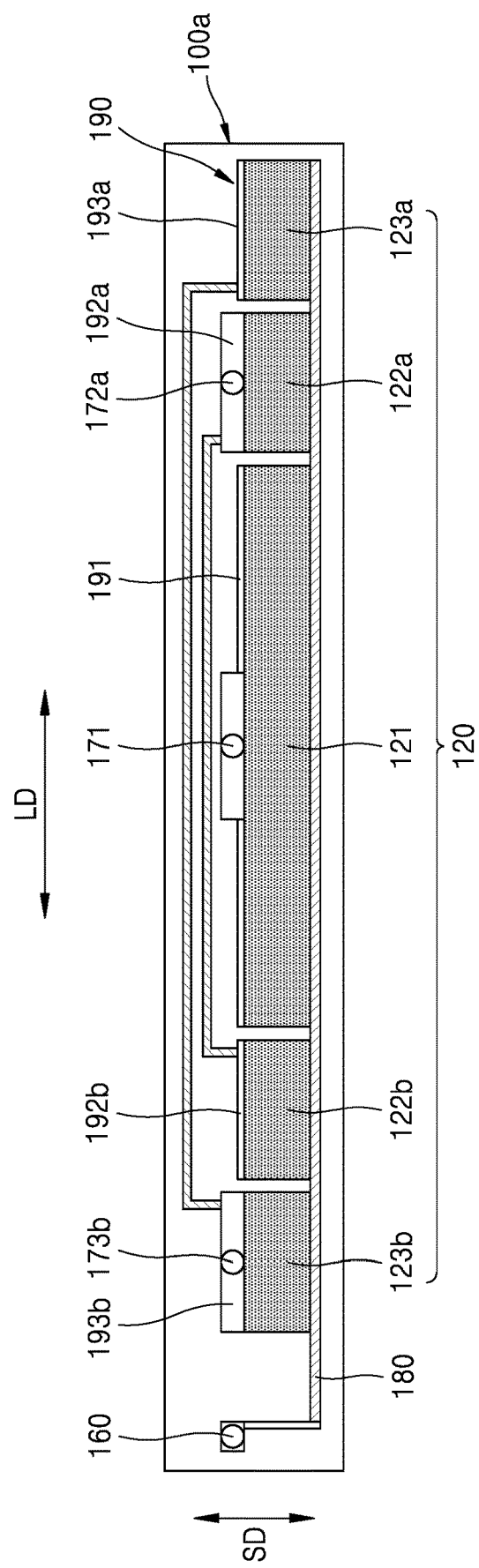
FIG. 11 is a plan view of a heater substrate according to an example.

FIG. 11 is a plan view of a heater substrate according to an example. Referring to FIG. 11, the heating element pattern 120 may include a plurality of solid patterns 121, 122a, 122b, 123a, and 123b arranged in the long side direction LD of a heater substrate 100a. The driving electrode 190 may include the plurality of driving electrodes 191, 192a, 192b, 193a, and 193b arranged to contact the plurality of solid patterns 121, 122a, 122b, 123a, and 123b, respectively, on one side of the heater substrate 100a in the short side direction SD. The common electrode 180 may be arranged to contact the plurality of solid patterns 121, 122a, 122b, 123a, and 123b on the other side of the heater substrate 100a in the short side direction SD. The driving power supply terminal 170 may include a plurality of driving power supply terminals 171, 172a, and 173b which are provided on one side of the heater substrate 100a in the short side direction SD, and connected to the plurality of driving electrodes 191, 192a and 192b, and 193a and 193b, respectively. The common terminal 160 is connected to the common electrode 180, and may be arranged on one side of the heater substrate 100a in the long side direction LD in parallel with the plurality of driving power supply terminals 171, 172a, and 173b.

The plurality of solid patterns 121, 122a, 122b, 123a, and 123b have lengths in the long side direction LD and may be apart from each other. The plurality of solid patterns 121, 122a, 122b, 123a, and 123b may have the same length, and one of the solid patterns 121, 122a, 122b, 123a, and 123b may have a different length than another of the solid patterns 121, 122a, 122b, 123a, and 123b. In an example, the solid patterns 121, 122a, 122b, 123a, and 123b are symmetrical in the long side direction LD. A length of the solid pattern 121 located at the center may be greater than lengths of the solid patterns 122a, 122b, 123a, and 123b located at both sides. The solid patterns 122a and 122b may be symmetrical about the solid pattern 121 and have the same length. The solid patterns 123a and 123b may be symmetrical about the solid pattern 121 and have the same length. The driving electrode 191 may be in contact with the solid pattern 121. The driving electrodes 192a, 192b, 193a, and 193b may be in contact with the solid patterns 122a, 122b, 123a, and 123b, respectively. The driving electrodes 192a, 192b, 193a, and 193b may be symmetrically arranged around the driving electrode 191. The driving electrodes 192a and 192b may be arranged symmetrically to each other and may be connected to each other, and the driving electrodes 193a and 193b may be arranged symmetrically to each other and may be connected to each other. The driving power supply terminals 171, 172a, and 173b may be provided on the driving electrodes 191, 192a, and 193b, respectively. With such a configuration, the number of driving power supply terminals may be reduced. Of course, as shown in FIG. 5, the plurality of driving electrodes 191, 192a, 192b, 193a, and 193b may be provided with the driving power supply terminals 171, 172a, 172b, 173a, and 173b. The common electrode 180 may extend to one end of the heater substrate 100a in the long side direction LD, and extend to a position parallel to the plurality of driving electrodes 191, 192a, 192b, 193a, and 193b in the short side direction SD. The common terminal 160 may be provided at the extended end of the common electrode 180.

With such a configuration, the driving power supply terminals 171, 172a, and 173b and the common terminal 160 may be arranged on one side of the heater substrate 100a in the short side direction SD. Therefore, a power supply line may be connected to the driving power supply terminals 171, 172a, and 173b and the common terminal 160. The temperature sensor sheet 200 shown in FIG. 4 may be mounted on the first surface 101 of the heater substrate 100a in the same form as shown in FIG. 7. In this case, the temperature sensors 211, 212, and 213 may detect temperatures of the solid patterns 121, 122b, and 123b, respectively. The example described in FIG. 7 with respect to the through hole 230 may be equally applied to the heater substrate 100a shown in FIG. 11.

The temperature sensor sheet 200a shown in FIG. 9 may be mounted on the first surface 101 of the heater substrate 100a in the same form as shown in FIG. 9. In this case, the temperature sensors 211, 212, and 213 may detect temperatures of the solid patterns 121, 122a, and 123a, respectively. The example described in FIG. 9 with respect to the through hole 230 may be equally applied to the heater substrate 100a shown in FIG. 11.

Figure 12:
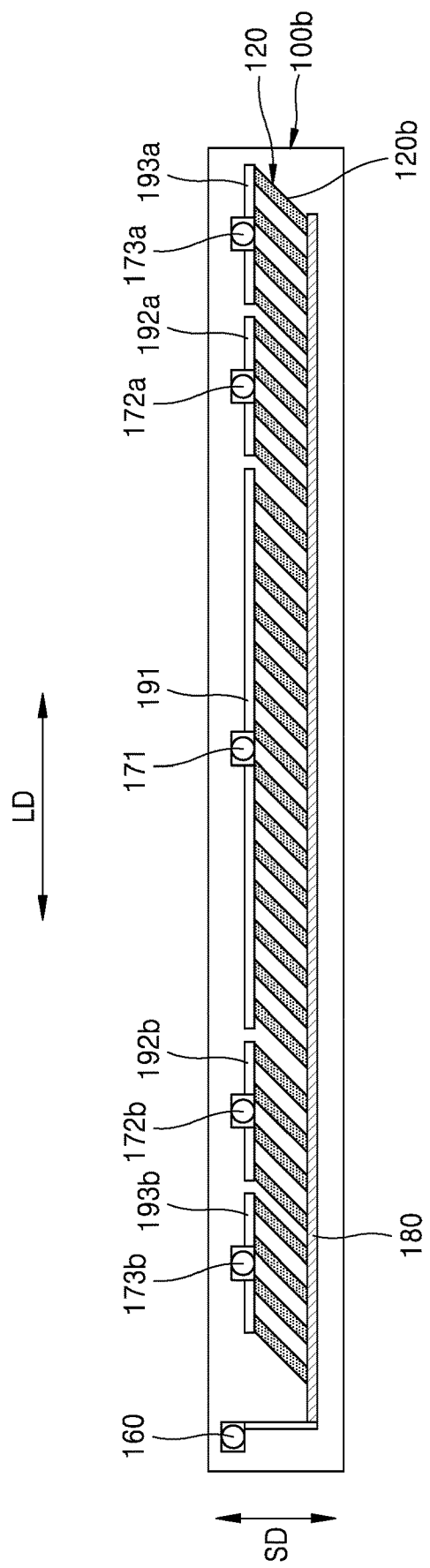
FIG. 12 is a plan view of a heater substrate according to an example.

FIG. 12 is a plan view of a heater substrate according to an example. Referring to FIG. 12, the heating element pattern 120 may include a plurality of inclined patterns 120b which are inclined with respect to the long side direction LD of a heater substrate 100b and arranged in the long side direction LD. The driving electrode 190 may include the plurality of driving electrodes 191, 192a, 192b, 193a, and 193b arranged on one side of the heater substrate 100b in the short side direction SD to be in contact with a portion of the plurality of inclined patterns 120b. The common electrode 180 may be disposed to contact the plurality of inclined patterns 120b on the other side of the heater substrate 100b in the short side direction SD. The driving power supply terminal 170 may include a plurality of driving power supply terminals 171, 172a, 172b, 173a, and 173b which are connected to the plurality of driving electrodes 191, 192a, 192b, 193a, and 193b, and provided on one side of the heater substrate 100b in the short side direction SD. The common terminal 160 may be connected to the common electrode 180, and may be arranged on one side of the heater substrate 100b in the long side direction LD in parallel with the plurality of driving power supply terminals 171, 172a, 172b, 173a, and 173b.

The plurality of driving electrodes 191, 192a, 192b, 193a, and 193b may be provided with the driving power supply terminals 171, 172a, 172b, 173a, and 173b, respectively. The common electrode 180 may extend to one end of the heater substrate 100 in the long side direction LD, and extend to a position parallel to the plurality of driving electrodes 191, 192a, 192b, 193a, and 193b in the short side direction SD. The common terminal 160 may be provided at the extended end of the common electrode 180.

Among the plurality of inclined patterns 120b, adjacent inclined patterns 120b are apart from each other. Two inclined patterns adjacent to each other among the plurality of inclined patterns 120b are apart from each other in the long side direction LD. With such a configuration, it is possible to reduce or prevent overheating of the heater substrate 100b. The two inclined patterns adjacent to each other among the plurality of inclined patterns 120b overlap each other in the short side direction SD. According to such a configuration, areas between the plurality of inclined patterns 120b may be sufficiently heated, and the heater substrate 100b may be heated to a uniform temperature.

The heater substrate 100b of the example illustrated in FIG. 12 is different in that the solid pattern 120a is replaced with the plurality of inclined patterns 120b compared to the example heater substrate 100 illustrated in FIG. 3. However, other elements illustrated in FIG. 12 and using the same reference numerals previously described are substantially the same as those illustrated above. Therefore, matters described in FIGS. 3 to 10 may be equally applied to the heater substrate 100b shown in FIG. 12.

Figure 13:
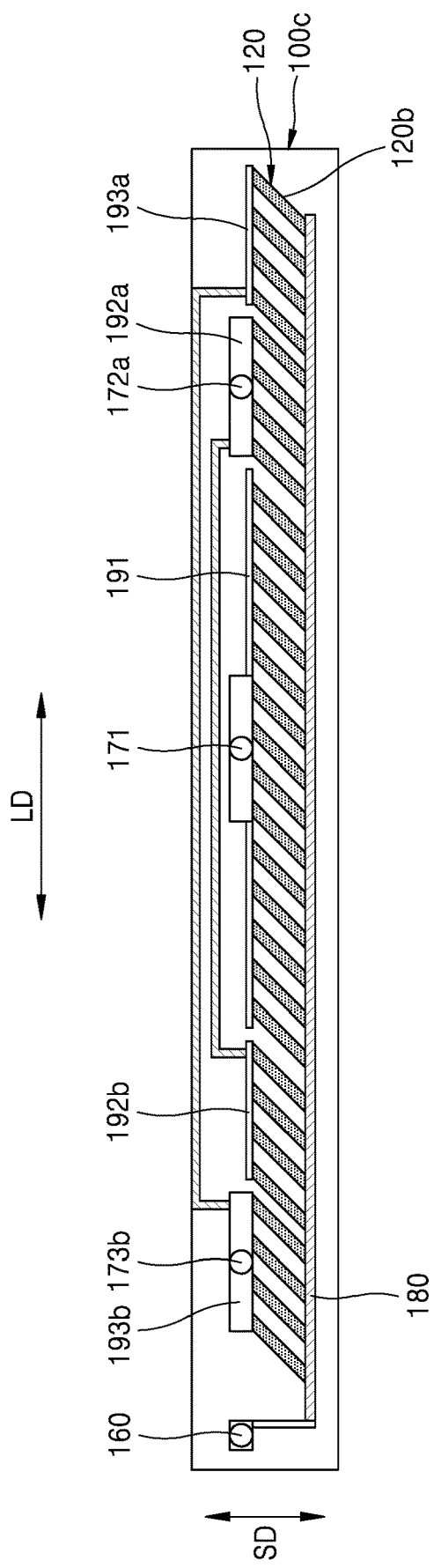
FIG. 13 is a plan view of a heater substrate according to an example.

FIG. 13 is a plan view of a heater substrate according to an example. Referring to FIG. 13, the heating element pattern 120 may include a plurality of inclined patterns 120b which are inclined with respect to the long side direction LD of a heater substrate 100c and arranged in the long side direction LD. The driving electrode 190 may include the plurality of driving electrodes 191, 192a, 192b, 193a, and 193b arranged on one side of the heater substrate 100c in the short side direction SD to be in contact with a portion of the plurality of inclined patterns 120b. The common electrode 180 may be disposed to contact the plurality of inclined patterns 120c on the other side of the heater substrate 100b in the short side direction SD. The driving electrodes 192a and 193a are arranged symmetrically to the driving electrodes 192b and 193b, respectively, with the driving electrode 191 located centrally in the long side direction LD at the center. The driving electrodes 192a and 192b arranged symmetrically to each other are connected to each other, and the driving electrodes 193a and 193b arranged symmetrically to each other are connected to each other. The driving power supply terminals 171, 172a, and 173b are provided on the driving electrodes 191, 192a, and 193b, respectively.

The heater substrate 100c of the example illustrated in FIG. 13 is different in the arrangement of driving power supply terminals compared to the heater substrate 100b shown in the example of FIG. 12. However, other elements illustrated in FIG. 13 and using the same reference numerals previously described are substantially the same as those illustrated above. Therefore, matters described in FIG. 12 may be equally applied to the heater substrate 100c shown in FIG. 13.

Figure 14:
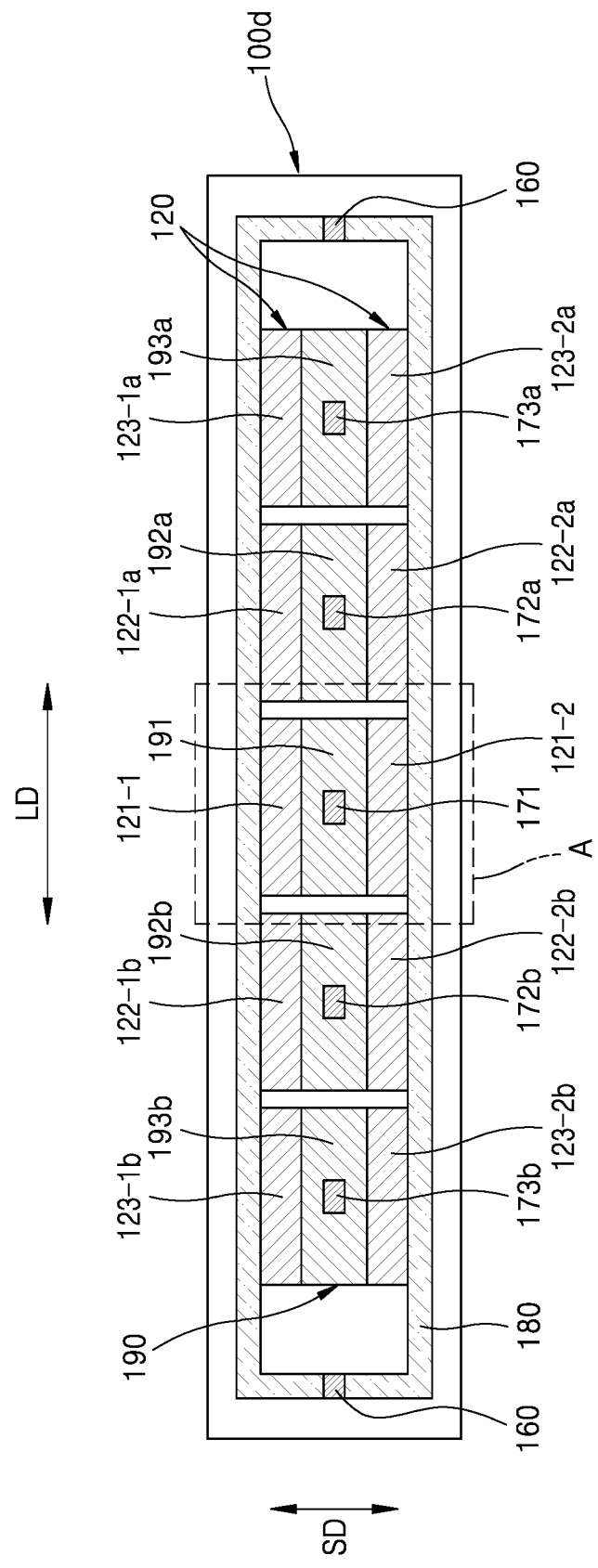
FIG. 14 is a plan view of a heater substrate according to an example.
Figure 15:
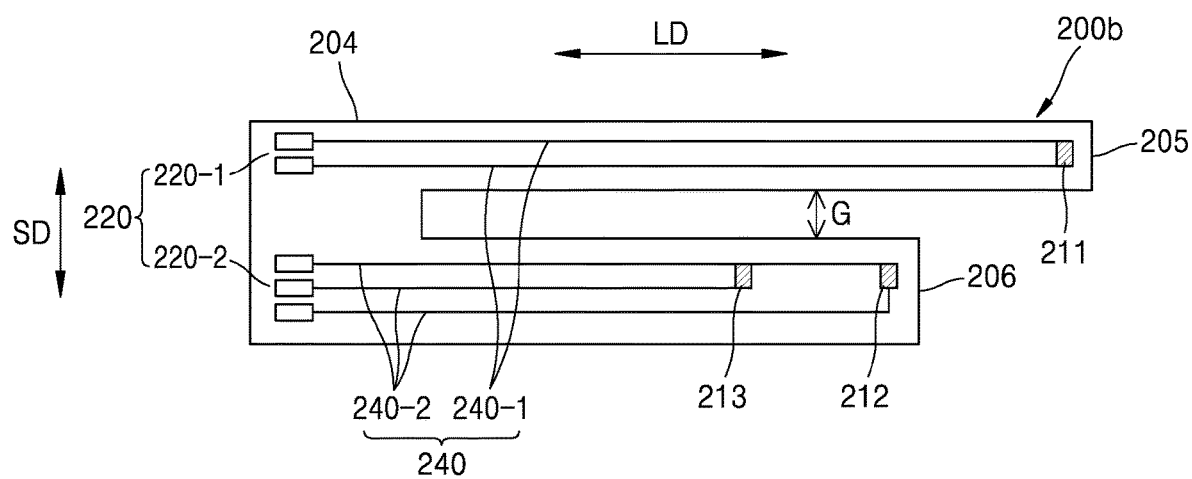
FIG. 15 is a plan view of a temperature sensor sheet according to an example.
Figure 16:
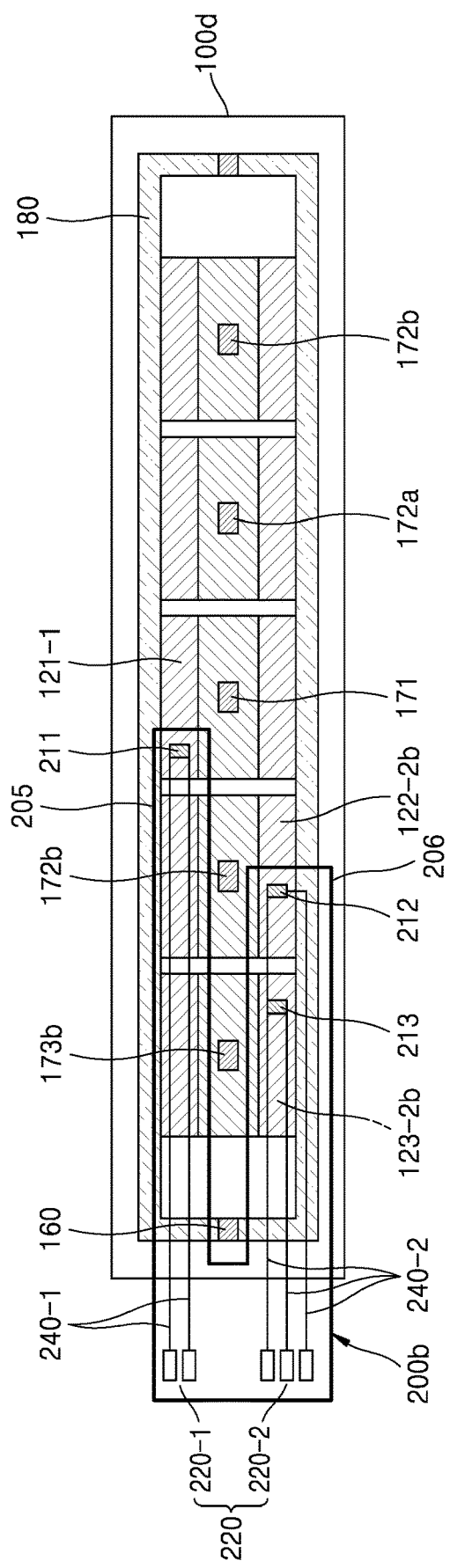
FIG. 16 is a plan view showing a state in which the temperature sensor sheet illustrated in FIG. 15 is mounted on the heater substrate illustrated in FIG. 14 according to an example.

FIG. 14 is a plan view of a heater substrate according to an example. FIG. 15 is a plan view of a temperature sensor sheet according to an example. FIG. 16 is a plan view showing a state in which the temperature sensor sheet illustrated in FIG. 15 is mounted on the heater substrate illustrated in FIG. 14 according to an example.

Referring to FIGS. 14 to 16, the heating element pattern 120 may include a plurality of first solid patterns 121-1, 122-1a, 122-1b, 123-1a, and 123-1b that are arranged to be apart from each other in the long side direction LD of a heater substrate 100d, and a plurality of second solid patterns 121-2, 122-2a, 122-2b, 123-2a, and 123-2b apart from the first solid patterns 121-1, 122-1a, 122-1b, 123-1a, and 123-1b in the short side direction SD of the heater substrate 100d. The driving electrode 190 may include the plurality of driving electrodes 191, 192a, 192b, 193a, and 193b arranged to contact the plurality of first solid patterns 121-1, 122-1a, 122-1b, 123-1a, and 123-1b and the plurality of second solid patterns 121-2, 122-2a, 122-2b, 123-2a, and 123-2b between the plurality of first solid patterns 121-1, 122-1a, 122-1b, 123-1a, and 123-1b and the plurality of second solid patterns 121-2, 122-2a, 122-2b, 123-2a, and 123-2b. The common electrode 180 may be arranged to surround the plurality of first solid patterns 121-1, 122-1a, 122-1b, 123-1a, and 123-1b and the plurality of second solid patterns 121-2, 122-2a, 122-2b, 123-2a, and 123-2b. The driving power supply terminal 170 may include the plurality of driving power supply terminals 171, 172a, 172b, 173a, and 173b arranged to be connected to the plurality of driving electrodes 191, 192a, 192b, 193a, and 193b in the center of the heater substrate 100d in the short side direction SD. The sensing terminal 220 may include a first sensing terminal 220-1 and a second sensing terminal 220-2 that are apart from each other so as not to overlap the plurality of driving power supply terminals 171, 172a, 172b, 173a, and 173b on both sides of the temperature sensor sheet 200b in the short side direction SD.

The plurality of first solid patterns 121-1, 122-1a, 122-1b, 123-1a, and 123-1b and the plurality of second solid patterns 121-2, 122-2a, 122-2b, 123-2a, and 123-2b may be paired in the short side direction SD. The plurality of first solid patterns 121-1, 122-1a, 122-1b, 123-1a, and 123-1b and the plurality of second solid patterns 121-2, 122-2a, 122-2b, 123-2a, and 123-2b each has a length in the long side direction LD and are apart from each other.

In an example, the plurality of first solid patterns 121-1, 122-1a, 122-1b, 123-1a, and 123-1b may be symmetrical in the long side direction LD. The plurality of second solid patterns 121-2, 122-2a, 122-2b, 123-2a, and 123-2b may be symmetrical in the long side direction LD. The first solid patterns 122-1a, 122-1b, 123-1a, and 123-1b may be symmetrical about the first solid pattern 121-1 located at the center, and the second solid patterns 122-2a, 122-2b, 123-2a, and 123-2b may be symmetrical about the second solid pattern 121-2 located at the center. The plurality of first solid patterns 121-1, 122-1a, 122-1b, 123-1a, and 123-1b and the plurality of second solid patterns 121-2, 122-2a, 122-2b, 123-2a, and 123-2b may be symmetrical in the short side direction SD. The plurality of second solid patterns 121-2, 122-2a, 122-2b, 123-2a, and 123-2b paired with the plurality of first solid patterns 121-1, 122-1a, 122-1b, 123-1a, and 123-1b may have the same length in the long side direction LD.

The driving electrodes 191, 192a, 192b, 193a, and 193b may be respectively connected to the plurality of first solid patterns 121-1, 122-1a, 122-1b, 123-1a, and 123-1b, and may also be respectively connected to the plurality of second solid patterns 121-2, 122-2a, 122-2b, 123-2a, and 123-2b. The driving power supply terminals 171, 172a, 172b, 173a, and 173b may be provided on the driving electrodes 191, 192a, 192b, 193a, and 193b, respectively. With such a configuration, the number of driving power supply terminals may be reduced.

The common terminal 160 may be provided on one side or both sides of a band-shaped common electrode 180 in the long side direction LD surrounding the plurality of first solid patterns 121-1, 122-1a, 122-1b, 123-1a, and 123-1b and the plurality of second solid patterns 121-2, 122-2a, 122-2b, 123-2a, and 123-2b. The power supply lines 150 (of FIG. 8) may be connected to the driving power supply terminals 171, 172a, 172b, 173a, and 173b arranged in the center of the heater substrate 100d in the short side direction SD from an upper side of the heater substrate 100d.

Referring to FIG. 15, the sensing terminal 220 may be arranged on one side of the temperature sensor sheet 200b in the long side direction LD. The sensing terminal 220 may include the first sensing terminal 220-1 and the second sensing terminal 220-2 that are apart from each other in the short side direction SD so as not to overlap the plurality of driving power supply terminals 171, 172a, 172b, 173a, and 173b. The first sensing terminal 220-1 and the second sensing terminal 220-2 may be arranged so as not to overlap the common terminal 160.

For example, the temperature sensor sheet 200b may include a first region 204 in which the first sensing terminal 220-1 and the second sensing terminal 220-2 are arranged, and a second region 205 and a third region 206 extending side by side in the long side direction LD from the first region 204. The second region 205 and the third region 206 are apart from each other in the short side direction SD, and a gap G is formed between the second region 205 and the third region 206. The electric wire 240 includes a first electric wire 240-1 provided in the second region 205 and a second electric wire 240-2 provided in the third region 206. The temperature sensor 211 is provided in the second region 205 and may be connected to the first sensing terminal 220-1 by the first electric wire 240-1. The temperature sensors 212 and 213 are provided in the third region 206 and may be connected to the second sensing terminal 220-2 by the second electric wire 240-2.

Referring to FIG. 16, a temperature sensor sheet 200b may be mounted on the first surface 101 of the heater substrate 100d. The temperature sensor sheet 200b may be mounted on the heater substrate 100d such that the driving power supply terminals 171, 172a, 172b, 173a, and 173b and the common terminal 160 are located between the second region 205 and the third region 206. The temperature sensor sheet 200b may be mounted on the heater substrate 100d such that the sensing terminal 220 is outwardly apart from one end of the heater substrate 100d in the long side direction LD. The temperature sensor 211 may measure a temperature of the first solid pattern 121-1 located at the center. The temperature sensors 212 and 213 may measure temperatures of the second solid patterns 122-2b and 123-2b. With such a configuration, the sensing terminal 220 and the electric wire 240 are separated from the driving power supply terminals 171, 172a, 172b, 173a, and 173b and the common terminal 160, thereby improving electrical safety. In addition, because an upper portion of the driving power supply terminals 171, 172a, 172b, 173a, and 173b is not covered, the power supply lines 150 (of FIG. 8) may be connected to the driving power supply terminals 171, 172a, 172b, 173a, and 173b from an upper portion of the heater substrate 100d.

Referring again to FIG. 14, the plurality of first solid patterns 121-1, 122-1a, 122-1b, 123-1a, and 123-1b may be apart from each other in the long side direction LD and the plurality of second solid patterns 121-2, 122-2a, 122-2b, 123-2a, and 123-2b may be apart from each other in the long side direction LD. Areas between the plurality of first solid patterns 121-1, 122-1a, 122-1b, 123-1a, and 123-1b and between the plurality of second solid patterns 121-2, 122-2a, 122-2b, 123-2a, and 123-2b of the heater substrate 100d become non-heating portions without the heating element pattern 120. The non-heating portions are not directly heated by the plurality of first solid patterns 121-1, 122-1a, 122-1b, 123-1a, and 123-1b and the plurality of second solid patterns 121-2, 122-2a, 122-2b, 123-2a, and 123-2b, but are heated by heat transferred from a heating portion heated by the plurality of first solid patterns 121-1, 122-1a, 122-1b, 123-1a, and 123-1b and the plurality of second solid patterns 121-2, 122-2a, 122-2b, 123-2a, and 123-2b. Therefore, a temperature of the non-heating portion may be lower than a temperature of the heating portion. A temperature difference between the heating portion and the non-heating portion may appear as a glossiness irregularity on a fixed image. That is, in an area corresponding to the non-heating portion in the fixed image, a band-shaped glossiness irregularity extending in the short-side direction SD, that is, a conveying direction of the print medium P may be generated. To address the glossiness irregularity, a temperature difference between the non-heating portion and the heating portion may be reduced.

By increasing the amount of heat generated by the plurality of first solid patterns 121-1, 122-1a, 122-1b, 123-1a, and 123-1b and the plurality of second solid patterns 121-2, 122-2a, 122-2b, 123-2a, and 123-2b in an area adjacent to the non-heated portion, the temperature difference between the heating portion and the non-heated portion may be reduced.

Figure 17:
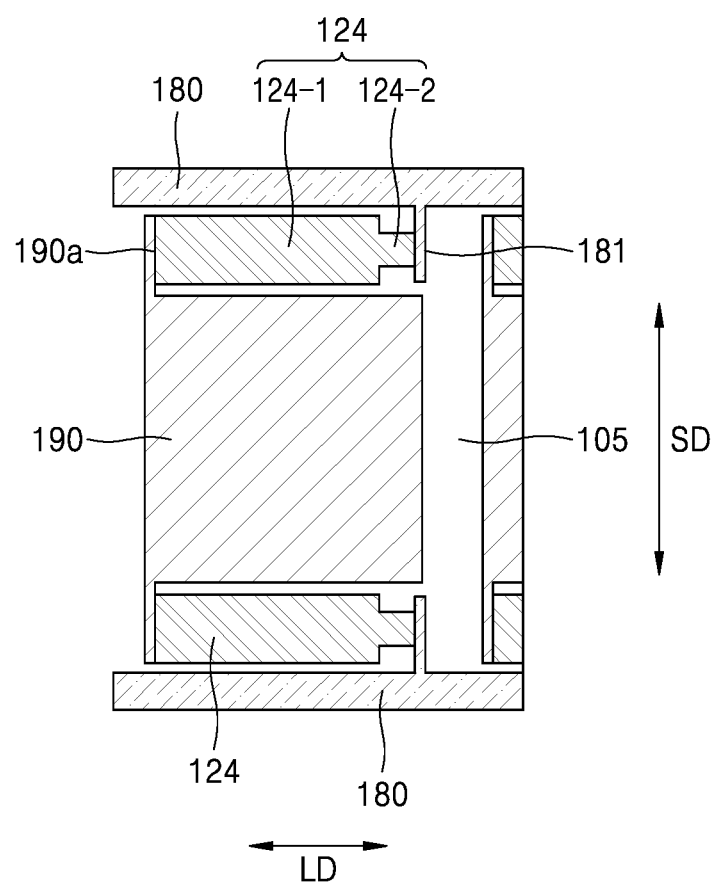
FIG. 17 is a plan view of a first solid pattern and a second solid pattern according to an example.

FIG. 17 is a plan view of a first solid pattern and a second solid pattern according to an example. Referring to FIG. 17, each unit solid pattern of the plurality of first solid patterns 121-1, 122-1a, 122-1b, 123-1a, and 123-1b and the plurality of second solid patterns 121-2, 122-2a, 122-2b, 123-2a, and 123-2b is referred to as 124. The unit solid pattern 124 may include a first portion 124-1 in contact with the driving electrode 190 and a second portion 124-2, which is adjacent to a gap, that is, a non-heating portion 105, in contact with the common electrode 180 and having a shorter width in the short side direction SD than the width of the first portion 124-1. A length of the second portion 124-2 in the long side direction LD may be less than a length of the first portion 124-1 in the long side direction LD.

As an example, the driving electrode 190 may include a first driving connection electrode 190a that contacts an end of the first portion 124-1 in the long side direction LD. The common electrode 180 may include a first common connection electrode 181 that contacts an end of the second portion 124-2 in the long side direction LD.

According to such a configuration, the resistance of the narrow second portion 124-2 is greater than that of the first portion 124-1, so that the amount of heat generated in the second portion 124-2 may be increased. Because the non-heating portion 105 is sufficiently heated by the second portion 124-2, a temperature difference between a heating portion and a non-heating portion may be reduced.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A fuser comprising:
a flexible fixing belt;
a backup member to form a fixing nip with the fixing belt;
a heater substrate for heating the fixing belt at the fixing nip and having a first surface comprising a heating element pattern, a common terminal and a driving power supply terminal for supplying power to the heating element pattern, and a second surface in contact with the fixing belt; and
a temperature sensor sheet comprising a temperature sensor, a sensing terminal, and an electric wire connecting the temperature sensor to the sensing terminal,
wherein the temperature sensor sheet is in contact with the first surface of the heater substrate such that the sensing terminal and the electrical wire do not overlap the common terminal and the driving power supply terminal.

2. The fuser of claim 1, wherein the temperature sensor sheet comprises a base layer on which the temperature sensor, the sensing terminal, and the electric wire are located, and a cover layer covering the temperature sensor and the electric wire.

3. The fuser of claim 1, wherein the temperature sensor sheet comprises a base layer on which the temperature sensor, the sensing terminal, and the electric wire are located, and a cover layer folded in a "c" shape from the base layer to cover the temperature sensor and the electric wire.

4. The fuser of claim 3, wherein the temperature sensor sheet is in contact with the first surface of the heater substrate such that a bent portion connecting the base layer to the cover layer faces the common terminal and the driving power supply terminal.

5. The fuser of claim 1,
wherein the common terminal and the driving power supply terminal are arranged on one side of the heater substrate in a short side direction, and
wherein the sensing terminal is arranged at one end of the temperature sensor sheet in a long side direction.

6. The fuser of claim 5, wherein the sensing terminal is arranged at an end of the temperature sensor sheet opposite to the common terminal in the long side direction.

7. The fuser of claim 5,
wherein the heating element pattern comprises a solid pattern extending in the long side direction of the heater substrate,
wherein the fuser comprises:
a plurality of driving electrodes arranged to contact the solid pattern on one side of the heater substrate in the short side direction, and arranged in the long side direction; and
a common electrode arranged to contact the solid pattern on the other side of the heater substrate in the short side direction,
wherein the driving power supply terminal is connected to the plurality of driving electrodes and comprises a plurality of driving power supply terminals provided on one side of the heater substrate in the short side direction, and
wherein the common terminal is connected to the common electrode, and is arranged on one side of the heater substrate in the long side direction in parallel with the plurality of driving power supply terminals.

8. The fuser of claim 7, wherein the solid pattern comprises a plurality of inclined patterns inclined with respect to the long side direction of the heater substrate and arranged in the long side direction.

9. The fuser of claim 5,
wherein the heating element pattern comprises a plurality of solid patterns arranged in the long side direction of the heater substrate,
wherein the fuser comprises:
a plurality of driving electrodes arranged to contact the plurality of solid patterns, respectively, on one side of the heater substrate in the short side direction; and
a common electrode arranged to contact the plurality of solid patterns on the other side of the heater substrate in the short side direction,
wherein the driving power supply terminal comprises a plurality of driving power supply terminals connected to the plurality of driving electrodes and provided on one side of the heater substrate in the short side direction, and
wherein the common terminal is connected to the common electrode, and is arranged on one side of the heater substrate in the long side direction in parallel with the plurality of driving power supply terminals.

10. The fuser of claim 1,
wherein the common terminal and the driving power supply terminal are arranged in the center of the heater substrate in a short side direction, and
wherein the sensing terminal comprises a first sensing terminal and a second sensing terminal that are apart from each other so as not to overlap the common terminal and the driving power supply terminal on both sides of the temperature sensor sheet in a short side direction.

11. The fuser of claim 10,
wherein the heating element pattern comprises a plurality of first solid patterns that are arranged to be apart from each other in a long side direction of the heater substrate to form a gap, and a plurality of second solid patterns apart from the first solid patterns in the short side direction of the heater substrate,
wherein the fuser comprises:
  a plurality of driving electrodes arranged to contact the plurality of first solid patterns and the plurality of second solid patterns between the plurality of first solid patterns and the plurality of second solid patterns; and
  a common electrode arranged to surround the plurality of first solid patterns and the plurality of second solid patterns,
wherein the driving power supply terminal comprises a plurality of driving power supply terminals arranged to be connected to the plurality of driving electrodes in the center of the heater substrate in the short side direction, and
wherein the sensing terminal comprises a first sensing terminal and a second sensing terminal that are apart from each other so as not to overlap the common terminal and the plurality of driving power supply terminals on both sides of the temperature sensor sheet in the short side direction.

12. The fuser of claim 11, wherein each unit solid pattern of the plurality of first solid patterns and the plurality of second solid patterns comprises a first portion in contact with the driving electrode and a second portion, which is adjacent to the gap, in contact with the common electrode and having a shorter width in the short side direction than the width of the first portion.

13. The fuser of claim 1,
wherein a through hole for exposing the first surface of the heater substrate is located in the temperature sensor sheet, and
wherein the fuser comprises a thermostat contacting the first surface of the heater substrate through the through hole.

14. The fuser of claim 1,
wherein a length of the temperature sensor sheet in a long side direction is less than a length of the heater substrate in the long side direction such that a portion of the first surface of the heater substrate is exposed, and
wherein the fuser comprises a thermostat contacting the first surface of the heater substrate.

15. An electrophotographic printer comprising:
a printing unit to form a visible toner image on a print medium; and
a fuser to fix the toner image to the print medium,
wherein the fuser comprises:
  a flexible fixing belt;
  a backup member to form a fixing nip with the fixing belt;
  a heater substrate for heating the fixing belt at the fixing nip and having a first surface comprising a heating element pattern, a common terminal and a driving power supply terminal for supplying power to the heating element pattern, and a second surface in contact with the fixing belt; and
  a temperature sensor sheet comprising a temperature sensor, a sensing terminal, and an electric wire connecting the temperature sensor to the sensing terminal,
wherein the temperature sensor sheet is in contact with the first surface of the heater substrate such that the sensing terminal and the electrical wire do not overlap the common terminal and the driving power supply terminal.

* * * * *